United States Patent [19]

Berridge

[11] Patent Number: 4,641,475
[45] Date of Patent: Feb. 10, 1987

[54] MOISTURE RESISTANT SEAM ASSEMBLY
[75] Inventor: Jack A. Berridge, Houston, Tex.
[73] Assignee: Berridge Manufacturing Co., Houston, Tex.
[21] Appl. No.: 859,793
[22] Filed: May 5, 1986

Related U.S. Application Data

[63] Continuation of Ser. No. 549,629, Nov. 7, 1983, abandoned.

[51] Int. Cl.⁴ .............................................. E04D 1/36
[52] U.S. Cl. ....................................... 52/584; 52/394; 52/466
[58] Field of Search ................... 52/395, 403, 460, 459, 52/461, 464, 465, 466, 467, 469, 470, 520, 543, 553, 573, 584, 716

[56] References Cited

U.S. PATENT DOCUMENTS

| | | | |
|---|---|---|---|
| 877,133 | 1/1908 | Spornhauer | 52/395 |
| 2,915,795 | 12/1959 | Kendall | 52/470 X |
| 3,063,201 | 11/1962 | Rylander | 52/470 X |
| 3,302,353 | 2/1967 | DuPradal | 52/469 |
| 3,374,578 | 3/1968 | Mesnel | 52/716 X |
| 3,392,498 | 7/1968 | Rogers | 52/469 X |
| 3,706,173 | 12/1972 | Taylor | 52/716 |
| 3,849,956 | 11/1974 | Collins | 52/469 X |
| 3,998,019 | 12/1976 | Reinwall, Jr. | 52/478 |
| 4,009,548 | 3/1977 | Hicks | 52/469 |
| 4,034,532 | 7/1977 | Reinwall, Jr. | 52/573 X |
| 4,089,145 | 5/1978 | DeVries, Jr. et al. | 52/469 X |
| 4,105,814 | 8/1978 | Eggert | 52/716 X |
| 4,107,898 | 8/1978 | Andrzejewski et al. | 52/716 |
| 4,117,638 | 10/1978 | Kidd et al. | 52/466 |
| 4,139,974 | 2/1979 | Fox | 52/468 X |
| 4,168,596 | 9/1979 | Yoder | 52/465 X |
| 4,184,299 | 1/1980 | East | 52/466 X |
| 4,188,765 | 2/1980 | Jackson | 52/716 |
| 4,220,681 | 9/1980 | Narita | 52/716 X |
| 4,222,210 | 9/1980 | Hanstein et al. | 52/469 X |
| 4,324,826 | 4/1982 | Ginster | 52/716 X |
| 4,366,656 | 1/1983 | Simpson | 52/465 X |
| 4,409,758 | 10/1983 | Dickerson et al. | 52/202 X |
| 4,476,658 | 10/1984 | Johnstone | 52/466 X |
| 4,483,113 | 11/1984 | Kruschwitz | 52/716 X |

FOREIGN PATENT DOCUMENTS

| | | | |
|---|---|---|---|
| 180385 | 5/1954 | Austria | 52/465 |
| 1934524 | 2/1973 | Fed. Rep. of Germany | 52/466 |
| 2070116 | 9/1981 | United Kingdom | 52/459 |

Primary Examiner—J. Karl Bell
Attorney, Agent, or Firm—Browning, Bushman, Zamecki & Anderson

[57] ABSTRACT

Discussed is a moisture resistant seam assembly for use with adjoining channel-shaped building surface covering members having adjoining mating flanges which form an elongate seam, the moisture resistant seam assembly comprising an elongate seam cover member adapted to be positioned over the elongate seam of the adjoining mating flanges of the adjoining channel-shaped building surface covering members and an elongate seal member with the elongate seam cover member for sealably engaging the adjoining mating flanges for preventing fluid migration between the seal cover member and the elongate seam.

6 Claims, 5 Drawing Figures

MOISTURE RESISTANT SEAM ASSEMBLY

This is a continuation of application Ser. No. 549,629, filed Nov. 7, 1983, now abandoned.

FIELD OF THE INVENTION

The present invention relates generally to channel-shaped building surface covering members for wall and roof sections and more particularly to the weather resistant covering and fastening of adjoining members.

DESCRIPTION OF THE PRIOR ART

The attachment of channel-shaped panels to various wall and roof portions of buildings has been accomplished in the past through the use of various deformable anchor clips and hollow seam covers. Such prior art anchor clips included horizontally opposed extending fingers which were bent over the properly positioned channel-shaped panels for securing such panels together along adjoining mating flanges. Thereafter, such mating flanges were enclosed by longitudinal seam covers.

In the attachment of channel-shaped panels to a wall or roof section, the use of such longitudinal seam covers resulted in serious problems of siphoning of moving water through the seam covers into the elongate seams by capillary action of the water over the adjoining mating flanges and between the seam covers and the mating flanges. Assembly difficulties have also occurred with such prior art seam covers due to difficulties in obtaining a water-tight fit of the seam cover over the deformed anchor clip fingers in attempts to provide weather resistant seams.

SUMMARY OF THE INVENTION

The present invention relates to a new and improved moisture resistant seam assembly for use with adjoining channel-shaped building surface covering members having adjoining mating flanges forming an elongate seam therebetween and includes generally an elongate seam cover member having an elongate seal member therewith and adapted to be in sealable engagement with the adjoining mating flanges for preventing fluid migration between the seam cover member and the elongate seam.

DESCRIPTION OF THE PREFERRED EMBODIMENT

The present invention relates to a new and improved moisture resistant seam assembly designated generally by the letter A. The moisture resistant seam assembly A includes generally a seam cover member M, seal means S within the seam cover member M, and anchor clip C.

Figure 1:
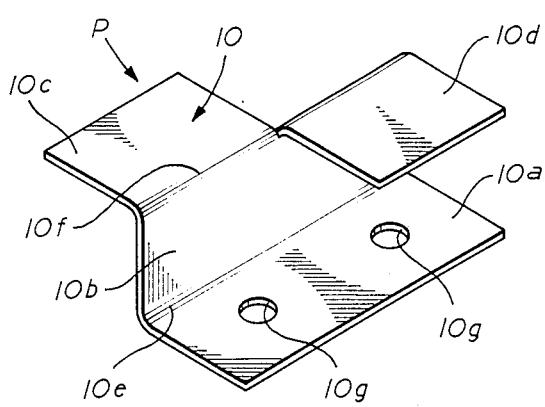
FIG. 1 is a perspective view of the anchor clip of the prior art.
Figure 2:
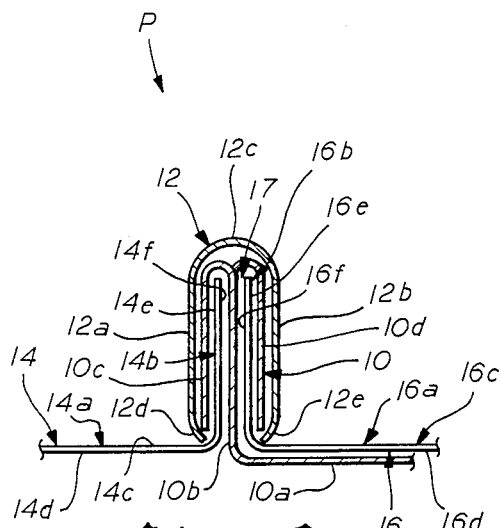
FIG. 2 is an elevational, cross-sectional view of a completed seam of the prior art.

In order to fully appreciate the novel and unique features of the moisture resistant seam assembly A of the present invention, it is instructive to first examine prior art seam assemblies such as that shown in FIGS. 1 and 2. The prior art seam assemblies are generally referred to in the drawings by the letter P and include a prior art anchor clip 10 and a prior art seam cover member 12.

The moisture resistant seam assembly A of the present invention and the prior art seam assemblies P generally are used in conjunction with channel-shaped building surface covering members such as covering members 14 and 16. Typically, the covering member 14, includes a base 14a and a mating leg, or flange 14b. Preferably, the base 14a includes an upper base surface 14c and a lower base surface 14d. Similarly, the covering member 16 includes a base 16a and mating leg, or flange 16b, with the base 16a having an upper base surface 16c and a lower base surface 16d. The mating flange 14b of covering member 14 further includes an outer mating surface 14e and an inner mating surface 14f. Similarly, the mating flange 16b of cover member 16 includes an outer mating surface 16e and an inner mating flange 16f.

The prior art seam assembly P is adapted to be assembled about the mating flanges 14b, 16b of the covering members 14, 16, with the anchor clip 10 properly positioning the covering members 14, 16 on the surface to be covered. It should be understood that a covering member such as the covering members 14, 16 may be used to form a wall section, roof section or some other structural building component as is known in the art, and is used in its most comprehensive sense herein.

The prior art anchor clip 10, as best seen in FIG. 1, included a planar base 10a, and upright portion 10b, a first locking member 10c and a second locking member 10d. The prior art anchor clip 10 was preformed in such a manner that the upright portion 10b was formed at substantially 90° with respect to the planar base 10a along edge surface 10e. The prior art anchor clip 10 further included the first locking member 10c and second locking member 10d, each being horizontally opposed with respect to the other along edge surface 10f formed between the locking members 10c, 10d and the upright portion 10b. Such prior art anchor clip 10 was preformed with the horizontally opposed locking members 10c, 10d being preformed at an angle of substantially 90° with respect to the upright portion 10b. The anchor clip 10 included suitable openings 10g formed in the planar base 10a for appropriately securing the anchor clip 10 in its proper position.

The prior art seam assembly P further included a seam cover member 12 (FIG. 2). The seam cover member 12 included generally parallel side portions 12a, 12b and a top portion 12c for joining the upper portions of the side portions 12a, 12b. Furthermore, the prior art seam cover member 12 included first and second bottom lips 12d, 12e formed with the lower portions of side portions 12a, 12b, respectively.

In the use of the prior art seam assembly P, the anchor clip 10 was appropriately positioned and secured to a support (not shown) by use of a suitable fastener (not shown) inserted through openings 10g. It should be understood that multiple anchor clips 10 would be used along the length of the elongate covering members 14, 16. Thereafter, the covering members 14, 16 were positioned such that the inner mating surfaces 14f, 16f were adjacent to the upright portion 10b of the anchor clip 10. Upon proper positioning thereof, the locking members 10c, 10d were folded downwardly such that the first locking member 10c was folded adjacent to the outer mating surface 14e of covering member 14 and the second locking member 10d was folded adjacent to the outer mating surface 16e of covering member 16. The seam cover member 12 was positioned over the anchor clip 10, covering member 14, 16 assembly such that the opening formed between the bottom lips 12d, 12e of the seam cover member 12 permitted placement of the seam cover member 12 over the folded locking members 10c, 10d of the anchor clip 10. Upon being properly positioned, the bottom lips 12d, 12e were in close proximity to the base 14a, 16a of covering members 14, 16.

However, the prior art seam assembly P was susceptible to flooding and/or a siphoning action occurring between and along an elongate seam 17 formed between the adjoining inner mating surfaces 14f, 16f of the elongate covering members 14, 16. This flooding and/or siphoning action would permit moisture to travel from the base 14a, 16a of the covering members 14, 16, up the outer mating surfaces 14e, 16e over and down into the elongate seam 17 formed by the inner mating surfaces 14f, 16f, into contact with the lower base surfaces 14d, 16d of the covering members 14, 16. This contact would permit those surfaces covered by the covering members 14, 16 to become moisture-ridden, precipitating leaks, corrosion, rotting, and other related undesirable results of such siphoning and flooding action.

Figure 3:
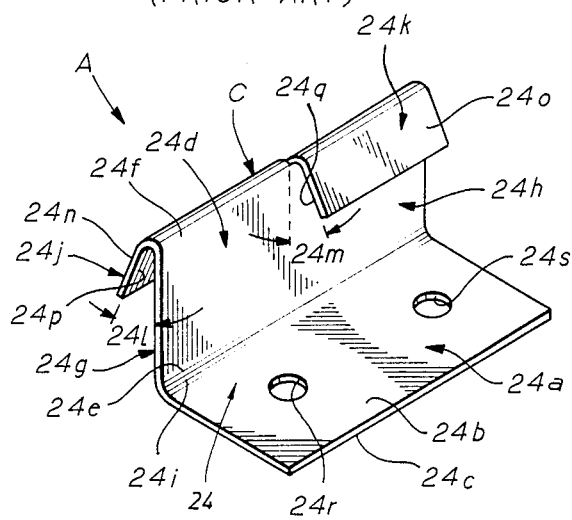
FIG. 3 is a perspective view of the anchor clip of the moisture resistant seam assembly of the present invention.
Figure 4:
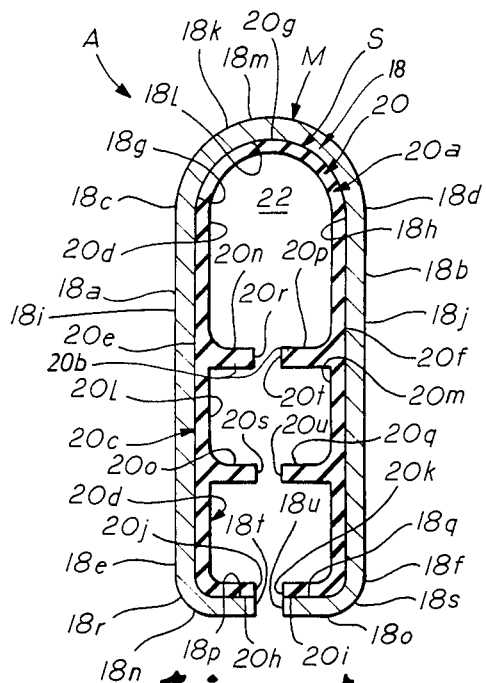
FIG. 4 is an elevational, cross-sectional view of the elongate seam cover member and seal means of the moisture resistant seam assembly of the present invention; and, FIG. 5 is an elevational, cross-sectional view of the moisture resistant seam assembly of the present invention.
Figure 5:
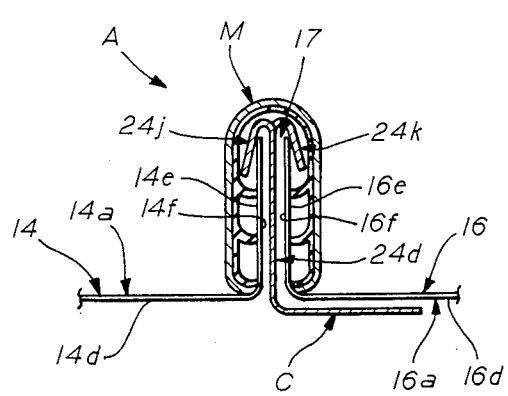

The present invention relates to a new and improved moisture resistant seam assembly A which includes an elongate seam cover member M, seal means S and anchor clips C, as best seen in FIGS. 3, 4 and 5. As illustrated in FIG. 4, the seam cover member M includes seam cover member 18. The seam cover member 18 includes elongate first and second side portions 18a, 18b which preferably are parallel to one another with each of the side portions 18a, 18b having an upper portion 18c, 18d, and a lower portion 18e, 18f, respectively. Furthermore, each of the side portions 18a, 18b includes an inner surface 18g, 18h and an outer surface 18i, 18j, respectively. The seam cover member 18 further includes a top portion 18k joining the upper portions 18c, 18d of side portions of 18a, 18b along their length, with the top portion 18k having an inner surface 18l and an outer surface 18m. Furthermore, the seam cover member 18 includes first and second elongate bottom lips 18n, 18o formed with the lower portions 18e, 18f of the first and second side portions 18a, 18b, respectively. Preferably, the bottom lips 18n, 18o include inner surfaces 18p, 18q and outer surfaces 18r, 18s, respectively.

The moisture resistant seam assembly A of the present invention further includes seal means S adapted to be positioned within the elongate seam cover member M. The seal means S includes seal member 20 which includes an elongate body section 20a and a plurality of elongate pliant fingers 20b. Preferably, the body section 20a is formed having an exterior surface designated generally as 20c and an interior surface designated generally as 20d, with the exterior surface 20c conforming substantially to the inner surfaces 18g, 18h of the side portions 18a, 18b, the inner surface 18l of top portion 18k, and inner surfaces 18p, 18q of bottom lips 18n, 18o when the seal member 20 is positioned within the seam cover member 18. As such, the exterior surface 20c of the seal member 20 specifically includes exterior surfaces 20e, 20f adjacent inner surfaces 18g, 18h, exterior surface 20g adjacent inner surface 18l, and exterior surfaces 20h, 20i adjacent inner surfaces 18p, 18q of bottom lips 18n, 18o, respectively. Preferably the seal member 20 terminates in end surfaces 20j, 20k which are substantially aligned with end surfaces 18t, 18u formed between inner surfaces 18p, 18q and outer surfaces 18r, 18s of the bottom lips 18n, 18o, respectively.

The seal member 20 further includes a plurality of pliant fingers, flaps or ridges, designated generally as 20b formed generally with and/or extending from the interior surface 20d of the seal member 20. The interior surface 20d includes interior surfaces 20l, 20m opposing exterior surfaces 20e, 20f of body section 20a of the seal member 20. As best seen in FIG. 4, the interior surface 20d of body section 20a of the seal member 20 forms a cavity 22 within the seal member 20. Preferably, pliant fingers 20b include fingers 20n, 20o which are formed with and/or extending from interior surface 20l and extend into the cavity 22. Similarly, pliant fingers 20b include fingers 20p, 20q which are formed with and/or extending from interior surface 20m and extend into cavity 22. Preferably, the fingers 20n, 20p are substantially horizontally aligned to one another as are fingers 20o, 20q, though oppposed fingers may be offset. Each of the fingers 20n, 20o, 20p, 20q has an engaging surface 20r, 20s, 20t, 20u, respectively. Preferably, the seal member 20 is formed out of any suitable sealing material, however, in practice it is preferred that the seal member 20 be formed of an extruded vinyl material such that the body section 20a and pliant fingers 20b are formable in a continuous, elongate manner.

The moisture resistant seam assembly A further includes anchor clip C, as best seen in FIG. 3. The anchor clip C includes anchor clip 24 which is formed having a planar base 24a having an upper surface 24b and a lower surface 24c. The anchor clip 24 further includes an upright portion 24d having a lower end 24e, an upper end 24f, a first vertical surface 24g, and a second vertical surface 24h. Preferably, the upright portion 24d is formed at substantially 90° with respect to the planar base 24a with the lower end 24e of the upright portion 24d in proximity to longitudinal edge 24i of the planar base 24a. The anchor clip 24 further includes locking tabs 24j, 24k formed with the upper end 24f of the upright portion 24d. The first locking tab 24j extends from the upper end 24f of the upright portion 24d at an acute angle 24l formed between the first vertical surface 24g of the upright portion 24d and the first locking tab 24j. Similarly, the second locking tab 24k preferably extends from the upper end 24f of the upright portion 24d at an acute angle 24m formed between the second vertical surface 24h of the upright portion 24d and the second locking tab 24k. The locking tabs 24j, 24k include outer surfaces 24n, 24o and inner surfaces 24p, 24q, respectively. Furthermore, the anchor clip 24 further includes openings 24r, 24s formed between surface 24b and lower surface 24c of the planar base 24a.

In the use or operation of the moisture resistant seam assembly A of the present invention, the anchor clip C is affixed to the supports (not shown) for the wall, roof, or other, surface to be constructed. Typically, multiple anchor clips C are disposed in the seam 17 between the elongate mating flanges 14b, 16b of the covering members 14, 16. The anchor clip 24 is secured to a support (not shown) by an appropriate fastener (not shown) that extends through the openings 24r, 24s in the planar base 24a. Thereafter, the covering members 14, 16 are positioned such that the inner mating surfaces 14f, 16f are in proximity to the first vertical surface 24g and second vertical surface 24h, respectively. It should be noted that because the locking tabs 24j, 24k are at preformed acute angles 24l, 24m, respectively, it is necessary for the covering members 14, 16 to be appropriately positioned in place.

As best seen in FIG. 5, the inner mating surface 14f is proximally disposed adjacent to the first vertical surface 24g and the inner mating surface 16f is proximally disposed adjacent to second vertical surface 24h, with the upper ends of the mating flanges 14b, 16b of the covering members 14, 16 being contained in part within the acute angles 24l, 24m formed with the locking tabs 24j, 24k and the upright portion 24d.

Without requiring additional crimping and/or folding as per the prior art anchor clip 10, the seam cover member M having the seal means S therewith is positioned for assembly over the anchor clip 24 and covering members 14, 16. The end surfaces 18t, 18u of the seam cover member 18 are positioned adjacent to the locking tabs 24j, 24k of the anchor clip, and then forced downwardly (as viewed in FIG. 5) over the locking tabs 24j, 24k. The seam cover member 18 preferably being formed of a resilient material expands to accommodate the angular fold of the locking tabs, 24j, 24k with respect to the upright portion 24d and is forced downwardly over such locking tabs 24j, 24k and positioned such that the end surfaces 18t, 20j are proximally located adjacent to the jonder of the planar base 14a and mating flange 14b of covering member 14, while end surfaces 18u, 20k are proximally disposed adjacent to the joinder of planar base 16a and mating flange 16b of covering member 16. Upon the end surfaces 18t, 18u and 20j, 20k expanding to be placed about the locking tabs 24j, 24k, the resiliency of the seam cover member 18 and seal member 20 permits the seam cover member 18 and seal member 20 combination to conform generally to its original shape with the resulting resilient contact action of the end surfaces 18t, 20j with the outer mating surface 14e of covering member 14 and end surfaces 18u, 20k engaging the outer mating surface 16e of the covering member 16. In similar fashion, the pliant fingers 20n, 20o engage the outer mating surface 14e of the cover member 14 with engaging surfaces 20r, 20s, respectively amd pliant fingers 20p, 20q engage the outer mating surface 16e of covering member 16 with engaging surfaces 20t, 20u, respectively. As a result, a multiple seal arrangement is effectuated by the seal member 20 engaging the outer mating surfaces 14e, 16e. Specifically, surfaces 20j, 20r, 20s sealably engage covering member 14 while surfaces 20k, 20t, 20u sealably engage covering member 16.

Accordingly, the moisture resistant seam assembly A of the present invention results in an assembly that prevents fluid migration between the seam cover member M and the adjoining mating flanges 14b, 16b of the covering members 14, 16. As noted hereinabove, the covering members 14, 16 are of elongate nature and as such the mating flanges form the elongate seam 17 therebetween. The plurality of pliant fingers 20b of the seal member 20 effectively prevents fluid migration into the elongate seam 17. While the drawings depict the preferred usage of four pliant fingers 20b, different numbers of pliant fingers 20b may be used without departing from the spirit of this disclosure. Furthermore, because of the preformed nature of the locking tabs 24j, 24k of the anchor clip 24, an expedited construction of the moisture resistant seam assembly A is effectuated.

Thus, the moisture resistant seam assembly A of the present invention allows for ease of assembly and further provides a weather resistance not found in prior art devices. The moisture resistant seam assembly A of the present invention further prevents capillary siphoning action of standing water over the covering members 14, 16 into the elongate seam 17. Thus, the present invention comtemplates an assembly which requires no deformation of the anchor clip locking members for installation while providing an integral, weather resistant seal.

The foregoing disclosure and description of the invention are illustrative and explanatory thereof, and various changes in the size, shape and materials, as well as in the details of the illustrated construction may be made without departing from the spirit of the invention.

What is claimed is:

1. A moisture resistant seam assembly for use with adjoining channel-shaped surface covering members having generally parallel, adjoining mating flanges which form an elongate seam therebetween, comprising:
   a. an elongate seal member comprising resilient material and including a plurality of elongate ridges; and
   b. an elongate cover member for positioning over such mating flanges and seam, and comprising substantially elongate first and second side portions connected by an elongate top portion so that said side portions may generally face each other from opposite sides of said mating flanges with said top portion covering said seam;
   c. wherein said seal member is mountable generally within said cover member to overlie said mating flanges, at least in part, without intervening said mating flanges, with said cover member so positioned over said mating flanges, and such that at least one said seal member ridge may sealingly engage the outer surface of each of said mating flanges, said seal member being held toward said flanges by said side portions of said cover member, to seal said seam.

2. A moisture resistant seam assembly as defined in claim 1:
   a. further comprising an anchor clip, said anchor clip formed having a planar base, an upright portion having a lower end, an upper end, a first vertical surface and a second vertical surface, said upright portion being at substantially 90° to said planar base at said lower end, and first and second locking tabs formed with said upper end of said upright portion;
   b. wherein said first locking tab extends from said upper end of said upright portion of said clip at an acute angle formed between said first vertical surface of said upright portion and said first locking tab, and said second locking tab extends from said upper end of said upright portion of said clip at an acute angle formed between said second vertical surface of said upright portion and said second locking tab;
   c. wherein said anchor clip is mountable with its upright portion positioned between said adjoining mating flanges and said first and second locking tabs cooperating with said upright portion to contain said flanges, at least in part, within said respective acute angles for securing said flanges in proximity to one another; and d. wherein said cover member and said seal member, so mounted therewithin, are mountable to completely overlie said locking tabs of said anchor clip, and to overlie, at least in part, said flanges with said ridges sealingly engaging said outer surfaces of said flanges, for sealably enclosing said seam.

3. A moisture resistant seam assembly as defined in claim 1 wherein said cover member further comprises first and second elongate lips formed adjacent lower portions of said first and second side portions, respectively.

4. A moisture resistant seam assembly as defined in claim 1 wherein said seal member is formed of extruded vinyl.

5. Apparatus as defined in claim 3 further comprising an elongate cover member formed having substantially elongate parallel side portions for positioning over said folded seal member for maintaining said seal member in position relative to said flanges.

6. Seal apparatus for providing seals against surfaces or mutually adjacent, generally parallel flanges of adjoining members or the like, comprising:
 a. an elongate seal member consisting of resilient material, and which may be generally folded over the edges of said flanges to face and engage said surfaces of said adjoining members; and
 b. at least one elongate ridge as part of said seal member for sealingly engaging one such member surface and at least one other elongate ridge as part of said seal member for sealingly engaging the other of said member surfaces;
 c. whereby said seal member may so overlie, at least in part, each of said member surfaces and, by means of said ridges, sealingly engage said surfaces.

* * * * *